United States Patent

Henning et al.

[11] 4,248,635
[45] Feb. 3, 1981

[54] HIGH-HIDING CALCIUM COLOR LAKES HAVING GREAT FULL-SHADE BRILLANCE AND IMPROVED LIGHTFASTNESS

[75] Inventors: Georg Henning, Ludwigshafen; Paul Güenthert, Schifferstadt, both of Fed. Rep. of Germany

[73] Assignee: BASF Aktiengesellschaft, Ludwigshafen, Fed. Rep. of Germany

[21] Appl. No.: 64,983

[22] Filed: Aug. 9, 1979

[51] Int. Cl.³ .............................................. C09D 1/00
[52] U.S. Cl. ...................................... 106/22; 106/289
[58] Field of Search ..................... 106/22, 288 Q, 289; 260/42.21

[56] References Cited

U.S. PATENT DOCUMENTS

| | | | |
|---|---|---|---|
| 2,478,768 | 8/1949 | Loche | 260/144 |
| 2,744,027 | 5/1956 | Struve et al. | 106/289 |
| 3,674,527 | 7/1972 | Komander et al. | 106/289 |

FOREIGN PATENT DOCUMENTS 1313147  11/1973  United Kingdom.
1516223   6/1978  United Kingdom.

OTHER PUBLICATIONS

Bios, Final Report No. 1661, pp. 132–134, Lenoir, The Chemistry of Synthetic Dyes, pp. 313, 332–336, 361–365 (1971).

*Primary Examiner*—Hosea E. Taylor
*Assistant Examiner*—Amelia B. Yarbrough
*Attorney, Agent, or Firm*—Oblon, Fisher, Spivak, McClelland & Maier

[57] ABSTRACT

High-hiding calcium color lakes, possessing great full-shade brilliance and improved lightfastness, of the general formula

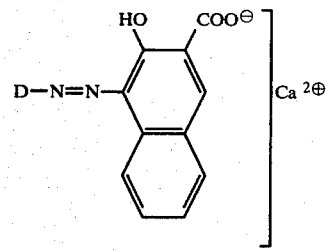

where D is a radical of the formula

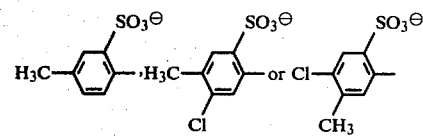

in which
(1) a predominant proportion of primary particles has one or more dimensions greater than 0.3 μm,
(2) the length/width ratio of the predominant proportion of primary particles is not less than 2:1 and for which
(3) the lightfastness of polyethylene containing 0.05% of colorant, and of plasticized PVC containing a 1:10 reduction of colorant, is rated at least 5 on a blue scale with ratings of from 1 to 8.

The lakes are particularly suitable for coloring plastics.

11 Claims, 6 Drawing Figures

HIGH-HIDING CALCIUM COLOR LAKES HAVING GREAT FULL-SHADE BRILLANCE AND IMPROVED LIGHTFASTNESS

SUMMARY OF THE INVENTION

The present invention relates to a calcium color lake of the general formula I

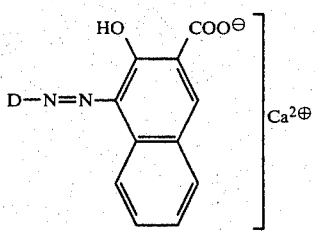

where D is a radical of the formula IIa, IIb or IIc

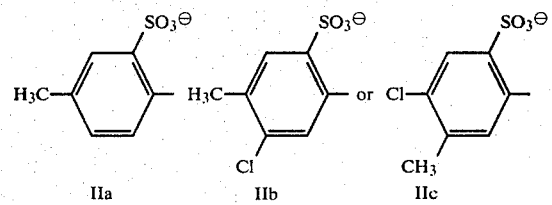

the lake being in a pigment form, in which
(1) a predominant proportion of primary particles has one or more dimensions greater than 0.3 μm,
(2) the length/width ratio of the predominant proportion of primary particles is not less than 2:1 and for which
(3) the lightfastness of polyethylene containing 0.05% of colorant, and of plasticized PVC containing a 1:10 reduction of colorant, is rated at least 5 on a blue scale with ratings of from 1 to 8.

DESCRIPTION OF THE PREFERRED EMBODIMENTS

Color lakes in which the predominant proportion of primary particles
(1) has at least one dimension of from 0.5 to 0.6 μm and
(2) has a length/width ratio greater than 3:1 are preferred.

Figure 1:
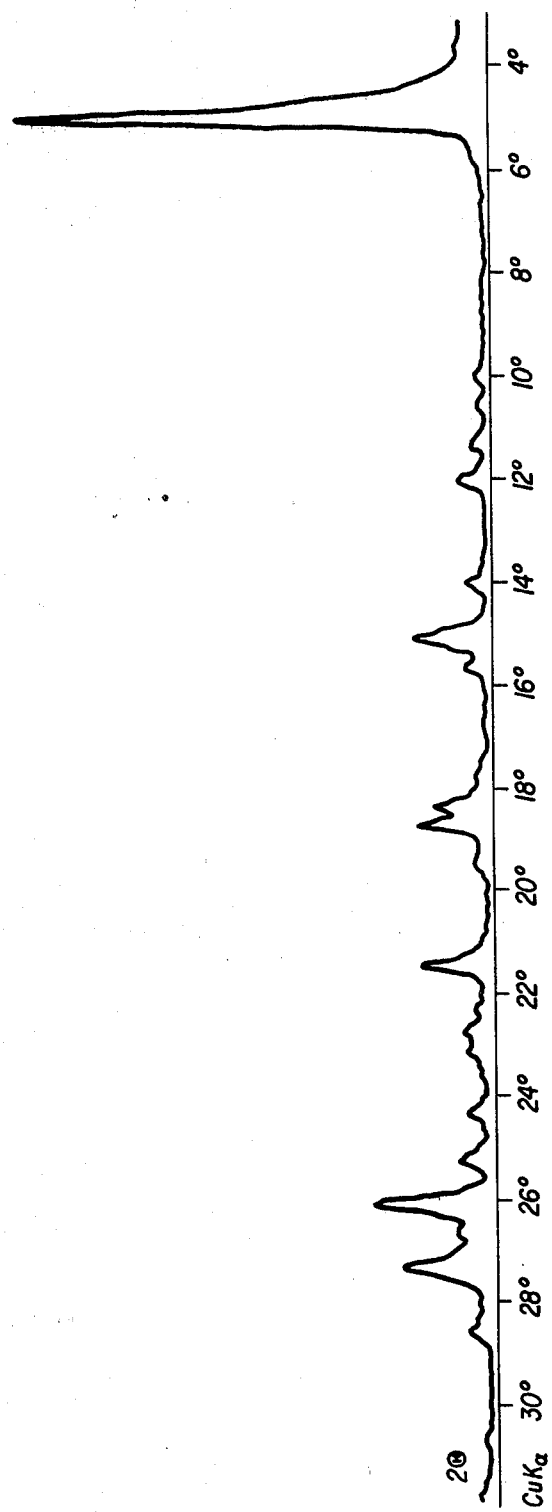
Figure 2:
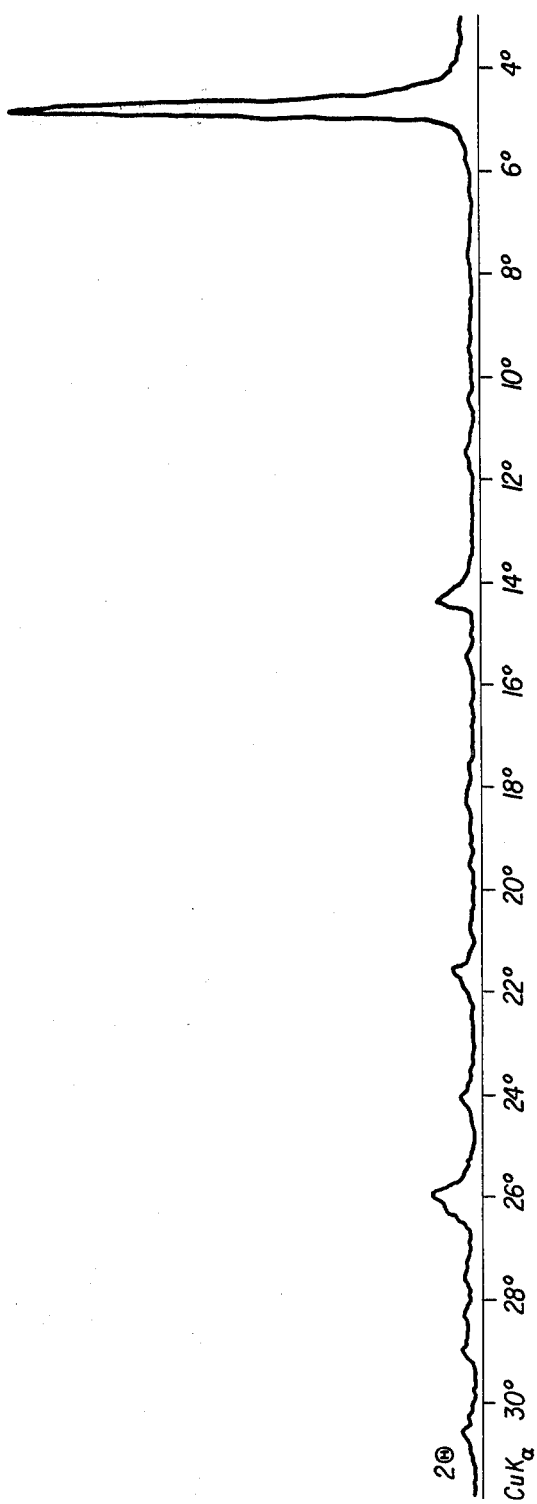
Figure 3:
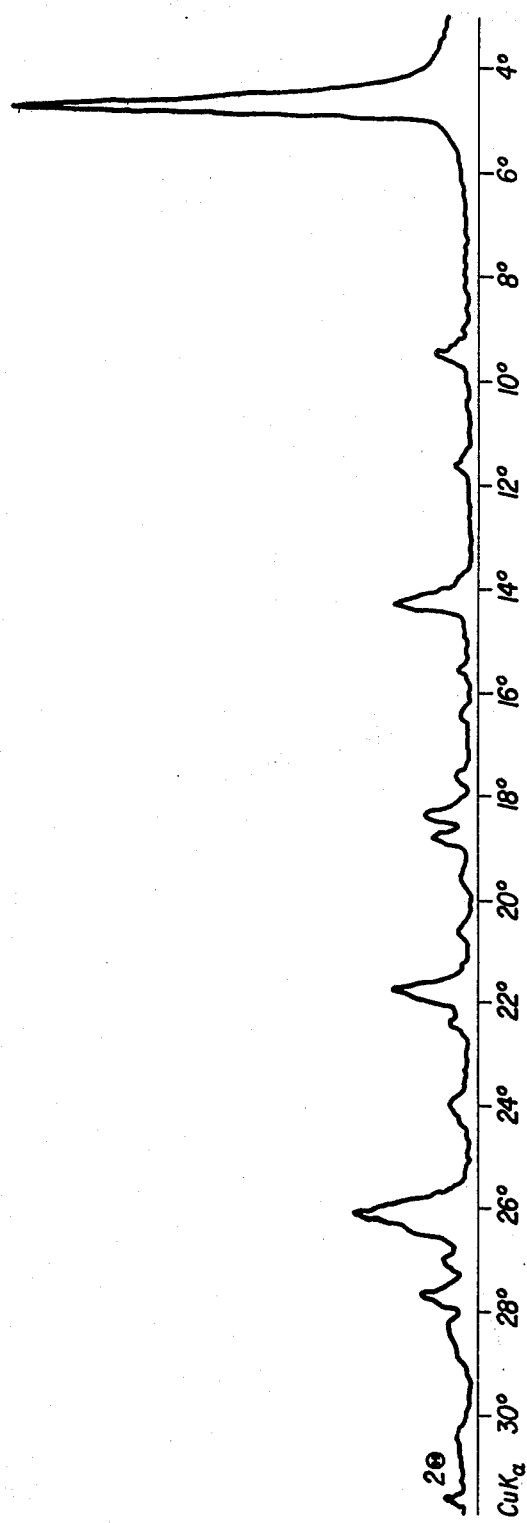

These color lakes have the X-ray diagrams shown in FIGS. 1, 2 and 3. FIG. 1 relates to the calcium lake of the general formula I, where D is a radical of the formula II a, whilst FIGS. 2 and 3 relate to the calcium lakes of the general formula I where D is, respectively, a radical of the formula II b (FIG. 2) or of the formula II c (FIG. 3).

Similar color lakes, but in which the predominant proportion of primary particles have a maximum dimension of less than 0.3 μm and a length/width ratio of less than 2:1 have been disclosed. The X-ray diagrams corresponding to these lakes are shown in FIGS. 1 a, 2 a and 3 a. They differ characteristically from the diagrams of FIGS. 1, 2 and 3 in that the relative intensity of the spectral lines has changed. The relative intensities are shown in Tables 1, 2 and 3, the strongest line being taken in each case as equal to 100.

TABLE 1

Figure 1A:
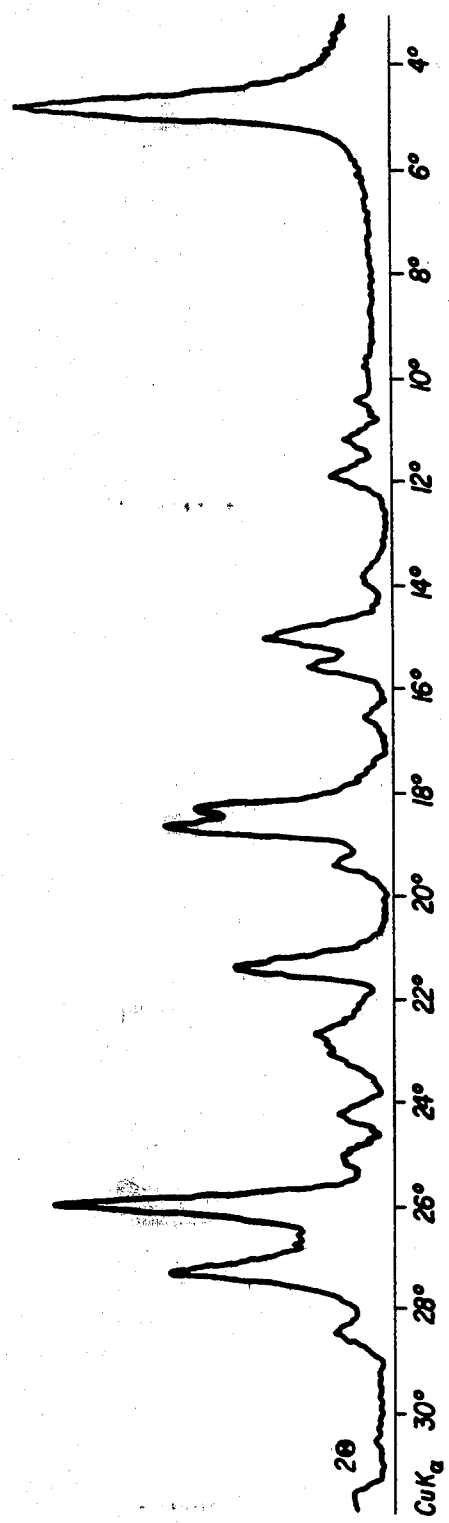

| FIG. 1 | | FIG. 1a | |
|---|---|---|---|
| Diffraction angle 2Θ (CuK$_\alpha$ radiation) | Intensity of the diffracted radiation (%) | Diffraction angle 2Θ (CuK$_{60}$ radiation) | Intensity of the diffracted radiation (%) |
| 5.0 | 100 | 4.8 | 100 |
| 15.1 | 16 | 15.0 | 36 |
| — | — | 15.6 | 23 |
| 18.4 | 12 | 18.3 | 56 |
| 18.7 | 16 | 18.6 | 63 |
| 21.5 | 15 | 21.3 | 45 |
| 26.0 | 27 | 25.9 | 98 |
| 27.3 | 20 | 27.3 | 64 |

TABLE 2

Figure 2A:
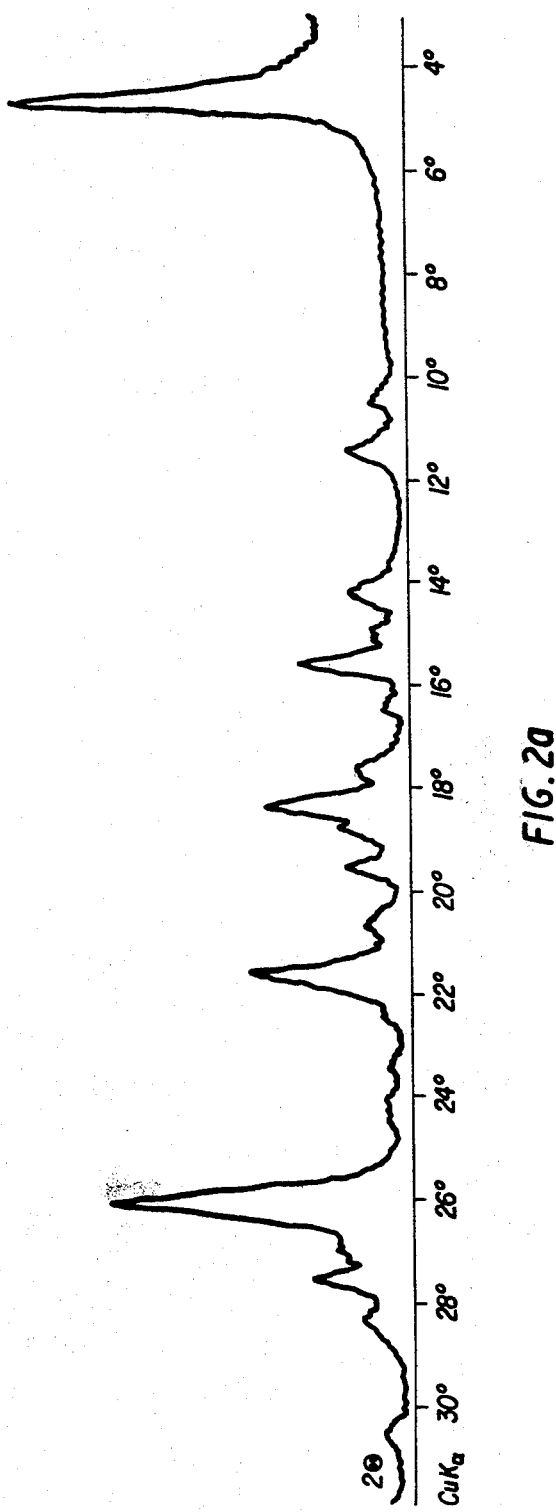

| FIG. 2 | | FIG. 2a | |
|---|---|---|---|
| Diffraction angle 2Θ (CuK$_\alpha$ radiation) | Intensity of the diffracted radiation (%) | Diffraction angle 2Θ (CuK$_\alpha$ radiation) | Intensity of the diffracted radiation (%) |
| 4.8 | 100 | 4.7 | 100 |
| — | — | 11.4 | 15 |
| 14.4 | 9 | 14.2 | 15 |
| — | — | 15.5 | 30 |
| — | — | 18.3 | 41 |
| — | — | 19.4 | 18 |
| 21.6 | 5 | 21.6 | 46 |
| 26.0 | 10 | 26.0 | 88 |
| 26.2 | 7 | — | — |
| — | — | 27.4 | 29 |

TABLE 3

Figure 3A:
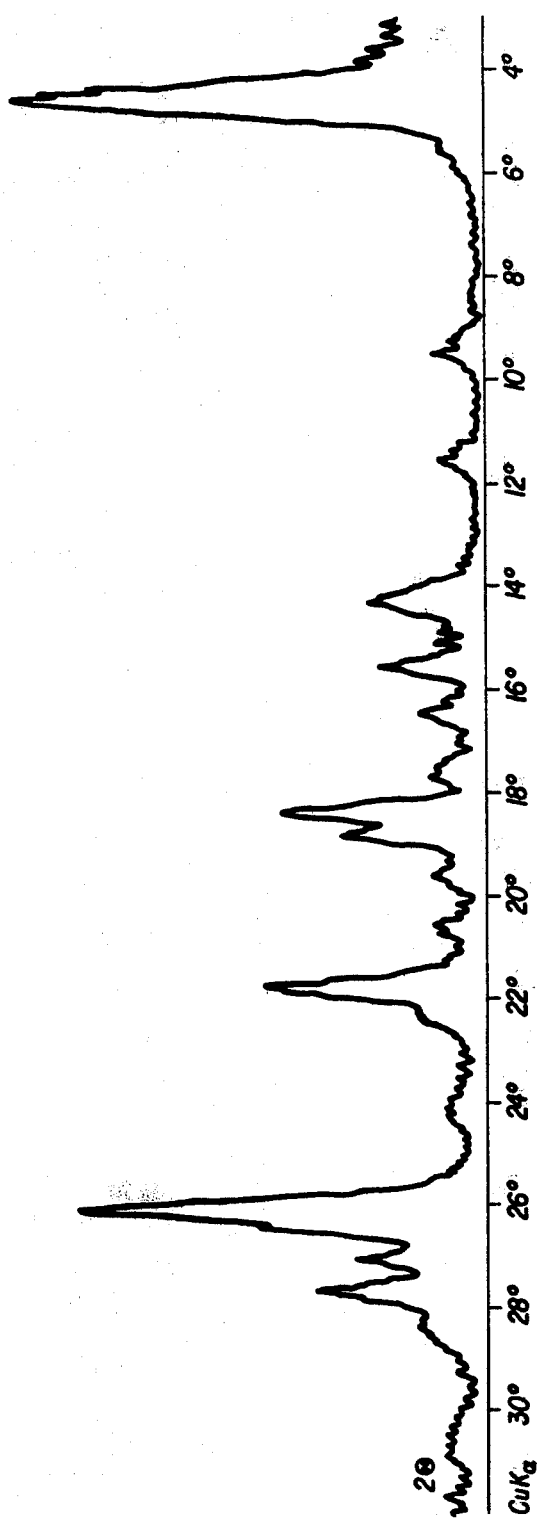

| FIG. 3 | | FIG. 3a | |
|---|---|---|---|
| Diffraction angle 2Θ (CuK$_\alpha$ radiation) | Intensity of the diffracted radiation (%) | Diffraction angle 2Θ (CuK$_\alpha$ radiation) | Intensity of the diffracted radiation (%) |
| 4.7 | 100 | 4.6 | 100 |
| 14.3 | 17 | 14.3 | 25 |
| — | — | 15.5 | 23 |
| 18.4 | 11 | 18.4 | 47 |
| 18.8 | 9 | 18.9 | 32 |
| 21.7 | 17 | 21.8 | 49 |
| 26.1 | 26 | 26.1 | 95 |
| 27.7 | 11 | 27.6 | 37 |

Surprisingly, the novel pigmentary form of the color lakes, when used in printing inks, surface coatings and plastics, exhibits improved lightfastness, improved full-shade brillance and high hiding power. Furthermore, it possesses substantially better dispersibility.

Thus, the lightfastness of the conventional color lakes in which the predominant proportion of primary particles having a maximum dimension of less than 0.3 μm and a length/width ratio of less than 2:1 can at best be rated 4, when determined on polyethylene containing 0.05% of colorant and on plasticized PVC containing a 1:10 reduction of colorant. By contrast, the lightfastness of the novel pigmentary form is at least 5. The hiding power of the novel pigmentary form is also substantially higher than that of the conventional products. The same remark applies to the full-shade brilliance and to the dispersibility, for example in plastics.

A calcium lake according to the invention can be prepared by reacting a salt of the formula III

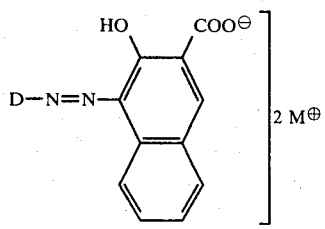

where M is, for example, sodium, potassium or ammonium, with a soluble calcium salt in an organic solvent, or in a mixture of water and an organic solvent.

Examples of suitable organic solvents are formamide, dimethylformamide, N-methylpyrrolidone, tetrahydrofuran, dioxane, glycols or glycol ethers, eg. ethylene glycol, propylene glycol, diethylene glycol and ethylene glycol monomethyl ether, monoethyl ether and monobutyl ether, and alkanols, eg. methanol, ethanol, n- and i-propanol and n- and i-butanol. The use of a mixture of water and an alkanol is preferred. Advantageous reaction temperatures are from 10° to 150° C., preferably from 50° to 90° C., and the total reaction time is as a rule from 1 to 10 hours.

Details of the method of preparation may be found in the Examples, where parts and percentages are by weight, unless stated otherwise.

The novel color lakes may be used in printing inks, surface coatings and, preferably, plastics, eg. polyvinyl chloride, polyolefins and polystyrene. Very brilliant, high-hiding colorations having excellent lightfastness and fastness to plasticizers are obtained.

EXAMPLE 1

18.7 parts of p-toluidine-3-sulfonic acid and 19.5 parts of β-hydroxynaphthoic acid are dissolved in 400 parts of water and 25 parts of 25% strength ammonia. After adding 110 parts of 5 N hydrochloric acid and 250 parts of ice, the mixture is diazotized with 35 parts of 3 N sodium nitrite solution at 0°–5° C.

Stirring is then continued for 30 minutes at 0°–5° C., after which the pH is brought to 8.5–9 with 25% strength ammonia.

The batch is heated to 80° C. and the product is salted out by adding 20 parts of ammonium chloride.

The ammonium salt obtained is filtered off and washed with a small amount of water.

To prepare the lake, the dye paste (of about 25% strength) is introduced into a solution of 20 parts of calcium chloride in 400 parts of water and 40 parts of isobutanol.

The mixture is stirred for 4 hours at 85° C. and the product is then filtered off, washed with water and dried at 80° C. 41.5 parts of a dark red color lake of the formula

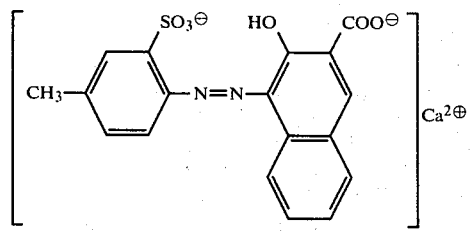

are obtained.

EXAMPLE 2

22.1 parts of 1-amino-3-methyl-4-chlorobenzene-6-sulfonic acid and 19.5 parts of β-hydroxynaphthoic acid are dissolved in 670 parts of water and 26 parts of 25% strength ammonia. After adding 110 parts of 5 N hydrochloric acid and 350 parts of ice, the mixture is diazotized with 35 parts of 3 N sodium nitrite solution at 0°–5° C.

Stirring is then continued for 2 hours at 0°–5° C., after which the pH is brought to 8.5–9 with 25% strength ammonia.

The batch is heated to 80° C. and the product is salted out by adding 30 parts of ammonium chloride. The ammonium salt obtained is filtered off and washed with a small amount of water.

To prepare the lake, the dye paste (of about 25% strength) is introduced into a solution of 20 parts of calcium chloride in 400 parts of water and 40 parts of isobutanol, and the mixture is then stirred for 4 hours at 85° C. The product is then filtered off, washed with water and dried at 80° C.

43 parts of a red color lake of the formula

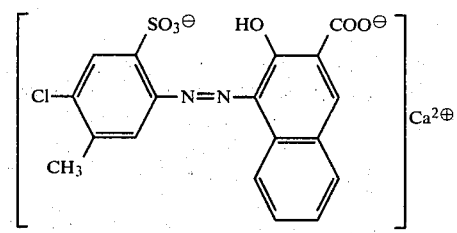

are obtained.

EXAMPLE 3

22.1 parts of 1-amino-5-chloro-4-methylbenzene-6-sulfonic acid are dissolved in 500 parts of water and 10 parts of 25% strength ammonia. After adding 50 parts of 2 N hydrochloric acid and 250 parts of ice, the mixture is diazotized with 35 parts of 3 N sodium nitrite solution at 0°–5° C.

Separately, 19.5 parts of β-hydroxynaphthoic acid are dissolved in 300 parts of water and 105 parts of 25% strength ammonia. The diazo suspension is added to this solution over 30 minutes, and the pH is brought to 9 with 25% strength ammonia.

The batch is warmed to 80° C. and the product is salted out by adding 30 parts of ammonium chloride.

The ammonium salt formed is filtered off and washed with a small amount of water. To prepare the lake, the dye paste (of about 25% strength) is introduced into a solution of 20 parts of calcium chloride in 400 parts of water and 40 parts of isobutanol.

The mixture is then stirred for 4 hours at 85° C. and the product is filtered off, washed with water and dried at 80° C.

42 parts of a red color lake of the formula:

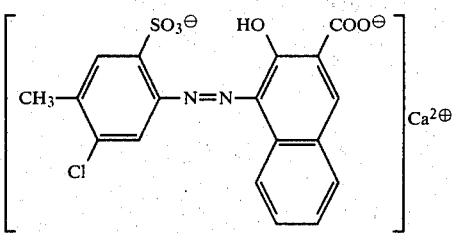

are obtained.

EXAMPLE 4

18.7 parts of p-toluidine-3-sulfonic acid and 19.5 parts of β-hydroxynaphthoic acid are dissolved in 400 parts of water and 17 parts of 50% strength sodium hydroxide solution. After adding 110 parts of 5 N hydrochloric acid and 250 parts of ice, the mixture is diazotized with 35 parts of 3 N sodium nitrite solution at 0°–5° C.

Stirring is then continued for 30 minutes at 0°–5° C., after which the pH is brought to 8.5 with 20% strength sodium hydroxide solution.

The batch is heated to 80° C. and the product is salted out by adding 25 parts of sodium chloride.

The sodium salt obtained is filtered off and washed with a small amount of water.

To prepare the lake, the dye paste (of about 25% strength) is introduced into a solution of 20 parts of calcium chloride in 400 parts of water and 40 parts of isobutanol. The mixture is stirred for 4 hours at 85° C. and the product is then filtered off, washed with water and dried at 80° C.

42 parts of a dark red color lake of the same formula as in Example 1 are obtained.

EXAMPLE 5

22.1 parts of 1-amino-3-chloro-4-methylbenzene-6-sulfonic acid are dissolved in 500 parts of water and 6 parts of 50% strength sodium hydroxide solution. After adding 50 parts of 5 N hydrochloric acid and 250 parts of ice, the mixture is diazotized with 35 parts of 3 N sodium nitrite solution at 0°–5° C.

Separately, 19.5 parts of β-hydroxynaphthoic acid are dissolved in 200 parts of water and 8 parts of 50% strength sodium hydroxide solution. The diazonium suspension is added thereto and the pH is brought to 8.5 with 20% strength sodium hydroxide solution.

The batch is warmed to 80° C. and the product is salted out by adding 25 parts of sodium chloride.

The sodium salt formed is filtered off and washed with a small amount of water. To prepare the lake, the dye paste (of about 25% strength) is introduced into a solution of 20 parts of calcium chloride in 350 parts of water and 110 parts of dimethylformamide. The mixture is stirred for 3 hours at 100° C. and the product is then filtered off, washed with water and dried at 80° C.

41.5 parts of a red color lake of the same formula as in Example 3 are obtained.

EXAMPLE 6

22.1 parts of 1-amino-3-methyl-4-chlorobenzene-6-sulfonic acid and 19.5 parts of β-hydroxynaphthoic acid are dissolved in 500 parts of water and 19 parts of 50% strength sodium hydroxide solution. After adding 114 parts of 5 N hydrochloride acid and 250 parts of ice, the mixture is diazotized with 35 parts of 3 N sodium nitrite solution at 0°–5° C.

Stirring is then continued for 2 hours at 0°–5° C., after which the pH is brought to 8.5 with 20% strength sodium hydroxide solution.

The batch is heated to 80° C. and the product is salted out by adding 25 parts of sodium chloride.

The sodium salt obtained is filtered off and washed with a small amount of water.

To prepare the lake, the dye paste (of about 25% strength) is introduced into a solution of 20 parts of calcium chloride in 250 parts of water and 250 parts of ethylene glycol monomethyl ether. The mixture is stirred for 4 hours at 100° C. and the product is then filtered off, washed with water and dried at 80° C. 42.5 parts of a red color lake of the same formula as in Example 2 are obtained.

EXAMPLE 7

18.7 parts of p-toluidine-3-sulfonic acid and 19.5 parts of β-hydroxynaphthoic acid are dissolved in 400 parts of water and 25 parts of 25% strength ammonia. After adding 110 parts of 5 N hydrochloric acid and 250 parts of ice, the mixture is diazotized with 35 parts of 3 N sodium nitrite solution at 0°–5° C.

Stirring is then continued for 30 minutes at 0°–5° C., after which the pH is brought to 8.5–9 with 25% strength ammonia.

To prepare the lake, 80 parts of isobutanol and 20 parts of calcium chloride are added and the mixture is stirred for 4 hours at 80° C. The product is then filtered off, washed with water and dried at 80° C.

41 parts of a dark red color lake of the same formula as in Example 1 are obtained.

EXAMPLE 8

22.1 parts of 1-amino-3-chloro-4-methylbenzene-6-sulfonic acid and 19.5 parts of β-hydroxynaphthoic acid are dissolved in 670 parts of water and 26 parts of 25% strength ammonia. After adding 110 parts of 5 N hydrochloric acid and 350 parts of ice, the mixture is diazotized with 35 parts of 3 N sodium nitrite solution at 0°–5° C.

Stirring is then continued for 2 hours at 0°–5° C., after which the pH is brought to 8.5–9 with 25% strength ammonia.

The batch is heated to 80° C. and the product is salted out by adding 30 parts of ammonium chloride.

The ammonium salt obtained is filtered off and washed with a small amount of water.

To prepare the lake, the dye paste is introduced into 400 parts of dimethylformamide and the mixture is heated to 100° C. At 100° C., a solution of 20 parts of calcium chloride in 80 parts of water is added dropwise. The mixture is then stirred for 2 hours at 100° C., and the product is filtered off, washed with water and dried at 80° C.

42.5 parts of a red color lake of the same formula as in Example 3 are obtained.

EXAMPLE 9

22.1 parts of 1-amino-3-chloro-4-methylbenzene-6-sulfonic acid and 19.3 parts of β-hydroxynaphthoic acid are dissolved in 400 parts of water and 17 parts of 50% strength sodium hydroxide solution at 60° C. After adding 85 parts of 5 N hydrochloric acid and 250 parts of ice, the mixture is diazotized with 35 parts of 3 N sodium nitrite solution at 0°–5° C.

Stirring is then continued for 30 minutes at 0°–5° C., the excess nitrite is destroyed with amidosulfonic acid, and the pH is brought to 10.2–10.5 with 50% strength sodium hydroxide solution.

After 15 minutes, the batch is heated to 70° C. and is kept at this temperature for 4 hours, whilst stirring. The sodium salt is isolated by filtration, without subsequent washing.

To prepare the lake, the dye paste is suspended in 400 parts of water at 40° C. in a pressure kettle and after adding 17 parts of solid calcium chloride the mixture is heated for 6 hours at 145° C. When it has cooled, the product is filtered off, washed with water until free from electrolyte, and dried.

43.5 parts of a red color lake of the same formula as in Example 3 are obtained.

USE EXAMPLES

EXAMPLE 10

Plasticized PVC: 0.1% of colorant.

0.05 parts of the colorant obtained as described in Example 3 and 50 parts of a mixture of 65 parts of polyvinyl chloride powder, 35 parts of di-(ethylhexyl) phthalate and 2 parts of dibutyl-tin bis-(thioglycollic acid hexyl ester) are homogenized for about 8 minutes on a mixing mill at 150°–160° C. The mixture is converted to a hide which is polished on a calender. The resulting hide exhibits a brilliant red very high-hiding coloration, having excellent lightfastness.

EXAMPLE 11

Plasticized PVC, 1:10 reduction.

0.25 parts of the coolant obtained as described in Example 1, 2.5 parts of titanium dioxide (rutile) and 50 parts of a mixture of 65 parts of polyvinyl chloride powder, 36 parts of di-(ethylhexyl) phthalate and 2 parts of dibutyltin bis-(thioglycollic acid hexyl ester) are homogenized for about 8 minutes on a mixing mill at 150°–160° C. The mixture is converted to a hide which is polished on a calender. The hide obtained has a red coloration of excellent lightfastness and exceptional fastness to plasticizer.

EXAMPLE 12

Plasticized PVC, 2:1

The procedure described in Example 10 is followed, but 0.5, instead of 0.25, part of coolant, and 0.25, instead of 2.5, part of titanium dioxide are used. The hide obtained has a brilliant red coloration of excellent lightfastness.

EXAMPLE 13

Rigid PVC, 0.1% of colorant.

0.1 part of colorant obtained as described in Example 2, 100 parts of polyvinyl chloride powder (suspension or emulsion product) and 2 parts of dibutyl-tin bis-(thioglycollic acid hexyl ester) are homogenized for about 8 minutes on a mixing mill at 150°–160° C. The mill hide obtained is pressure on a platen press at 140° C. under about 0.4 kg/cm² to give a sheet, which exhibits a red color of excellent lightfastness.

EXAMPLE 14

Rigid PVC, 1:10 reduction 0.1 part of colorant obtained as described in Example 5, 100 parts of polyvinyl chloride powder (suspension or emulsion product), 1 part of titanium dioxide (rutile) and 2 parts of dibutyl-tin bis-(thioglycollic acid hexyl ester) are homogenized on a mixing mill, as described in Example 12, and then pressed to form a sheet, which exhibits a red coloration having excellent lightfastness.

EXAMPLE 15

Rigid PVC, 2:1

1 part of colorant obtained as described in Example 4, 100 parts of polyvinyl chloride powder (suspension or emulsion product), 0.5 part of titanium dioxide (rutile) and 2 parts of dibutyl-tin bis-(thioglycollic acid hexyl ester) are homogenized for about 8 minutes on a mixing mill at 150°–160° C. The mill hide obtained is pressed on a platen press at 140° C. under about 0.4 kg/cm² to give a sheet, which exhibits a brilliant red color of excellent lightfastness.

EXAMPLE 16

Polyethylene, 0.05% of colorant 0.05 part of colorant obtained as described in Example 6 is dry-blended with 100 parts of high-pressure polyethylene powder in a drum mixer. The mixture is melted, and homogenized, on an extruder, with a barrel temperature of 160°–200° C. The colored plastic mass is granulated by die face-cutting or by drawing off strands and cooling these. The granules obtained are then injection-molded at 200° C., or compression-molded. The red moldings obtained have excellent lightfastness.

EXAMPLE 17

Polyethylene, 1:10 reduction 0.1 part of the colorant from Example 8 is mixed with 100 parts of high-pressure polyethylene powder and 1 part of titanium dioxide (rutile), as described in Example 15, and the mixture is converted to red moldings which have very good lightfastness.

EXAMPLE 18

Polystyrene, 0.5% of colorant 0.05 part of colorant obtained as described in Example 3 is dry-blended with 100 parts of ground polystyrene block polymer in a drum mixer. The mixture is melted, and homogenized, on an extruder, with a barrel temperature of 200°–250° C. The colored plastic mass is granulated by die face-cutting or by drawing off strands and cooling these. The granules obtained are then injection-molded at 200°–250° C., or compression-molded. Moldings exhibiting a brilliant red, high-hiding coloration are obtained.

Instead of a polystyrene block polymer, a polystyrene emulsion polymer or suspension polymer, or a copolymer with butadiene and acrylonitrile or acrylic esters can be used.

EXAMPLE 19

Polystyrene, 1:10 reduction 0.1 part of the colorant from Example 7 is mixed with 100 parts of ground polystyrene block polymer and 1 part of titanium dioxide, as described in Example 18. The mixture is melted, homogenized and granulated. The granules obtained are injection-molded or compression-molded at a processing temperature of 200°–250° C. The moldings obtained exhibit a brilliant red coloration having good lightfastness.

We claim:

1. High-hiding calcium color lakes, possessing great fullshade brilliance and improved lightfastness, of the general formula

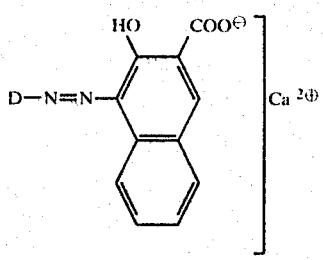

where D is a radical of the formula

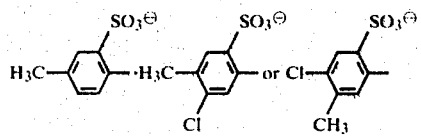

in which
(1) a predominant proportion of primary particles has one or more dimensions greater than 0.3 μm,
(2) the length/width ratio of the predominant proportion of primary particles is not less than 2:1 and for which
(3) the lightfastness of polyethylene containing 0.05% of colorant, and of plasticized PVC containing a 1:10 reduction of colorant, is rated at least 5 on a blue scale with ratings of from 1 to 8.

2. A process for the preparation of a compound as claimed in claim 1, which comprises:
reacting the alkali metal salt or ammonium salt of said compound with a water soluble calcium salt in a polar oxygen-containing organic solvent or a mixture of water and said organic solvent.

3. The process of claim 2, wherein said organic solvent is selected from the group consisting of formamide, dimethyl formamide, N-methylpyrrolidone, tetrahydrofuran, dioxane, glycols, glycol ethers and alkanols.

4. The process of claim 2, wherein said reaction is carried out in a mixture of water and said organic solvent.

5. The process of claim 2, wherein the temperature of said reaction is 10°–150° C.

6. The process of claim 5, wherein said temperature is 50°–90° C.

7. The process of claim 2, wherein said reaction is carried out between 1 and 10 hours.

8. The calcium color lakes of claim 1, wherein a predominant proportion of primary particles has at least one dimension of from 0.5 to 0.6 μm.

9. The calcium color lakes of claim 1, wherein the predominant proportion of primary particles has a length/width ratio greater than 3:1.

10. The calcium color lake prepared by the process of any of claims 2 or 4.

11. In a process for coloring a material selected from the group consisting of surface coating, printing inks or plastics the improvement which comprises mixing said coating, ink or plastic with a calcium color lake of claim 1.

* * * * *